Dec. 17, 1940.  O. A. AUDILET  2,225,516
AGRICULTURAL IMPLEMENT
Filed Nov. 27, 1939 2 Sheets-Sheet 1

Inventor
O. A. Audilet

By Clarence A. O'Brien
and Hyman Berman
Attorneys

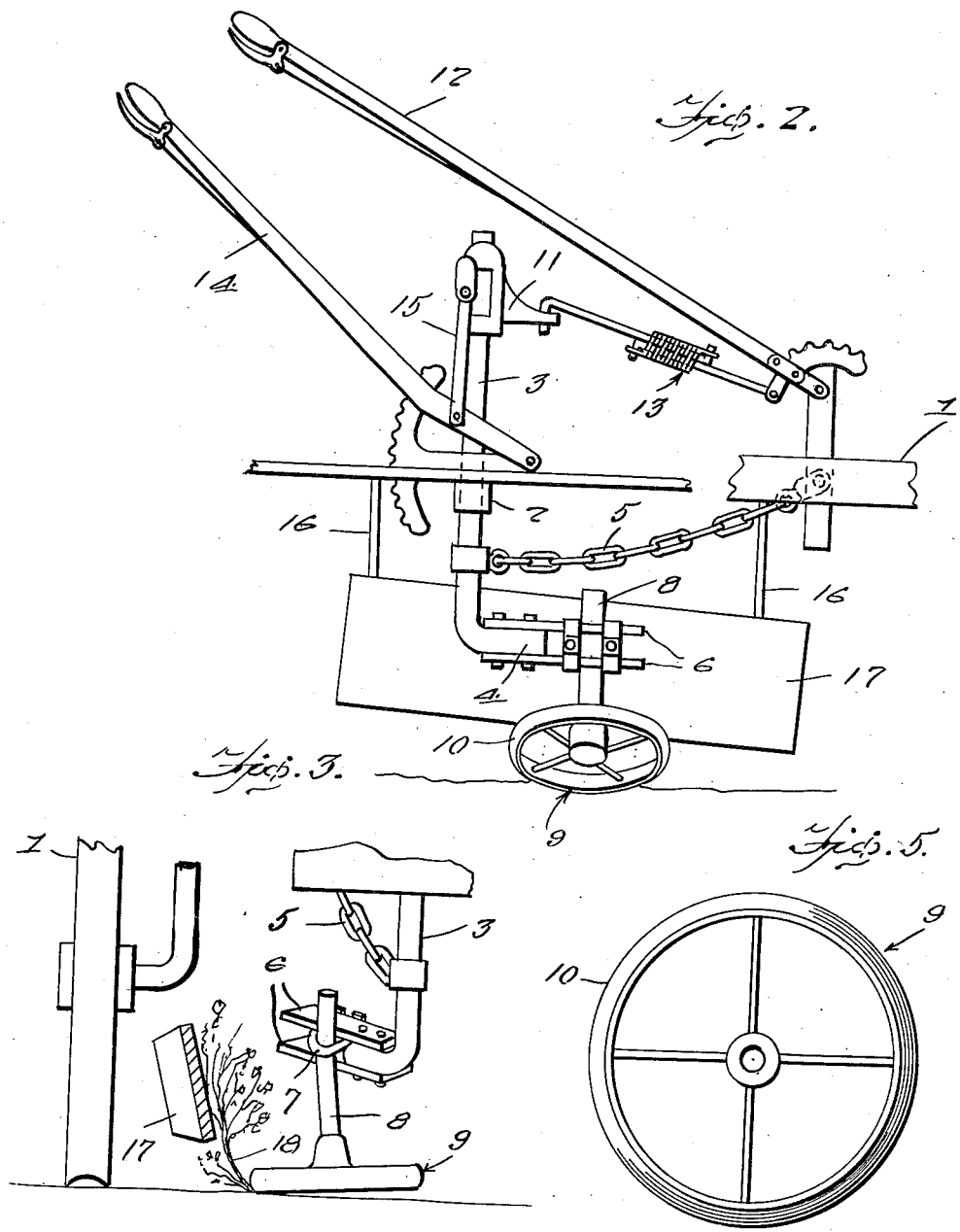

Patented Dec. 17, 1940

2,225,516

UNITED STATES PATENT OFFICE 2,225,516

AGRICULTURAL IMPLEMENT

Osmar A. Audilet, Yorktown, Tex.

Application November 27, 1939, Serial No. 306,377

4 Claims. (Cl. 97—179)

The present invention relates to new and useful improvements in agricultural implements and has for its primary object to provide, in a manner as hereinafter set forth, novel means for shifting or moving laterally the usual ridge of dirt in a row of tap root plants, such as cotton, whereby grass and weeds growing on said ridge may be easily destroyed by the usual shovels or sweeps of a cultivator.

Another very important object of the invention is to provide an agricultural implement of the aforementioned character which may be expeditiously adjusted as desired to meet various conditions.

Still another very important object of the invention is to provide an implement of the character described which, if desired, may be conveniently mounted for operation on a conventional wheeled cultivator without the necessity of making material structural alterations therein.

Other objects of the invention are to provide an agricultural implement of the character described which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 2 is a view in side elevation of the device.

Figure 3 is a view in rear elevation, illustrating the action of the ridge wheel, the lifting fender being shown in cross section.

Figure 5 is a plan view of the ridge wheel.

Figure 1:
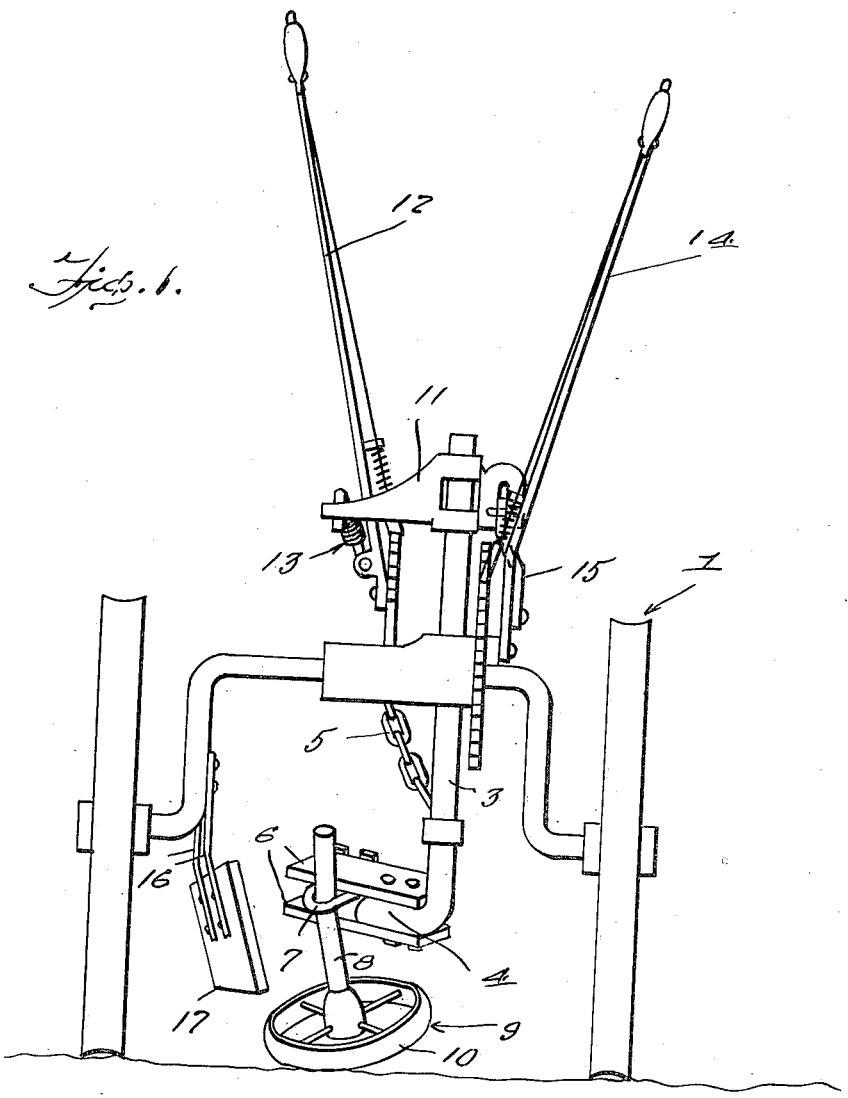
Figure 1 is a view in rear elevation, showing the invention mounted for operation on a single row cultivator.
Figure 4:
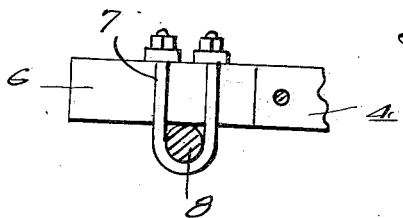
Figure 4 is a detail view in horizontal section, showing the means for adjustably securing the ridge wheel shaft in position.

Referring now to the drawings in detail, it will be seen that the reference numeral 1 designates generally a single row wheeled cultivator from which the usual shovels, sweeps, or other tools have been omitted. Rotatably and slidably mounted in a suitable bearing 2 which is provided therefor on the cultivator 1 is a vertical shank 3. At its lower end, the shank 3 terminates in an angularly projecting arm 4. A chain 5 has one end connected to the lower portion of the shank 3 and its other end secured to the cultivator 1 at a point forwardly of the bearing 3 in a manner to function as a brace or support for said shank.

Secured on the arm 4 and projecting beyond the free end thereof is a pair of spaced, metallic bars 6. Adjustably secured by means including a U-bolt 7 on the bars 6 and depending therefrom is an angular shaft 8. Journaled on the lower end portion of the shaft 8 is a ridge engaging wheel 9. It will be observed that the wheel 9 comprises a rim 10 of arcuate cross section.

Fixed on the upper end portion of the shank 3 is an arm 11. The reference numeral 12 designates a hand lever which is mounted for swinging movement on the cultivator 1. The hand lever 12 is operatively coupled to the arm 11 for rotating the shank 3 in a manner to swing the wheel 9 toward or away from the row of plants through the medium of a longitudinally extensible connector 13.

Also mounted on the cultivator 1 is a hand lever 14. A link 15 operatively connects the lever 14 to the inner end of the arm 11 for raising and lowering the shank 3 with the wheel 9 thereon.

Depending from the cultivator 1 is a pair of suitable hangers 16. Mounted on the hangers 16 and associated with the wheel 9 is a lifter 17. It may be well to here state that the wheel 9 is adapted to travel on one side of the row and the plant lifter 17 on the other side of said row. In Fig. 3 of the drawing, the reference numeral 18 designates a cotton plant.

The device is to be used when the plants are past the tender age. As the device travels along the row the wheel 9 engages and pushes or moves the usual ridge of dirt with the weeds and grass thereon laterally to one side of the row where it may be easily destroyed by the usual cultivator tools. The device may be used on a cultivator with or without these tools on said cultivator. If the plants 18 are bent over by the wheel 9 they are caught and straightened up by the lifter 17. Having tap roots, the plants are not injured by this treatment. In fact, it has been found that the growth and bearing of the plants are promoted by the treatment of the ground in this manner. Through the medium of the hand levers 12 and 14 the wheel 9 may be conveniently swung toward or away from the row and raised or lowered as desired. The adjustability of the angular shaft 8 permits the wheel 9 to be mounted at different angles or inclinations.

It is believed that the many advantages of an agricultural implement constructed in accordance with the present invention will be readily understood and although a preferred embodiment is as illustrated and described, it is to be understood that changes in the details of construction and in the combination and arrangement of parts may be resorted to which will fall within the scope of the invention as claimed.

What is claimed is:

1. An agricultural implement of the class described comprising a wheeled support, a vertical shank mounted for rotary and vertical sliding adjustment on said support, a shaft mounted on said shank, an inclined wheel journaled on said shaft and engageable with a ridge of dirt for shifting said ridge laterally, means for rotating the shank, and means for raising and lowering said shank.

2. An agricultural implement of the class described comprising, in combination, a wheeled support, an inclined wheel rotatably mounted on said support and engageable with a ridge of dirt in a row of plants for shifting said ridge laterally, and a lifter mounted on the support and engageable with the plants on the opposite sides of the row from the wheel for straightening up said plants after the wheel has passed.

3. An agricultural implement of the class described comprising a wheeled support, a vertical shank adjustably mounted on the support, means for adjusting said shank, an arm on the lower end of the shank, a pair of spaced bars mounted on said arm, an angular shaft adjustably secured to said bars, and an inclined wheel journaled on said shaft and engageable with a ridge of dirt for shifting said ridge laterally.

4. An agricultural implement comprising a wheeled support, and a wheel mounted on said support and engageable with a ridge of dirt for shifting said ridge laterally, said wheel being inclined away from the ridge with substantially its lower peripheral portion only engageable therewith.

OSMAR A. AUDILET.